Nov. 12, 1968 M. WIESLER ET AL 3,410,992

PUNCHED CARD READING AND PROGRAMMING DEVICE

Filed April 16, 1964 2 Sheets-Sheet 1

INVENTORS
MORDECHAI WIESLER
VIRGILIJUS MARTINONIS
BY
Morse & Altman
ATTORNEYS

PUNCHED CARD READING AND PROGRAMMING DEVICE

Filed April 16, 1964 2 Sheets-Sheet 2

INVENTORS
MORDECHAI WIESLER
VIRGILIJUS MARTINONIS
BY
Morse & Altman
ATTORNEYS 3,410,992

PUNCHED CARD READING AND PROGRAMMING DEVICE

Mordechai Wiesler and Virgilijus Martinonis, Brookline, Mass., assignors to Transistor Automation Corp., Cambridge, Mass., a corporation of Massachusetts Filed Apr. 16, 1964, Ser. No. 360,252
3 Claims. (Cl. 235—61.11)

ABSTRACT OF THE DISCLOSURE

A drum of translucent material holds a punched card which is curled and inserted therein. A latch holds and positions the card in place. An electro-optical head provides a light source and light detecting elements and extends in spaced relation on opposite sides of the drum wall whereby, when the drum is rotated, coded signals are generated from light passing through the apertures in the punched card.

This invention relates generally to punched card reading devices and more particularly is directed towards a new and improved high-speed drum-type reader and programmer into which a punched card may be quickly and easily inserted for movement past a detector head assembly.

Punched cards are frequently employed for purposes such as controlling automatic processes, feeding programs to computer systems, delivering parameters to automatic testing devices and the like. Various devices are available to which the punched cards may be mounted for reading but heretofore these devices have not been entirely efficient from the standpoint of ease and convenience in changing cards and also from the standpoint of simplified design and dependable low-cost construction.

Accordingly, it is an object of the present invention to provide improvements in punched card reading devices.

Another object of this invention is to provide a punched card reading device in which coded cards may be quickly and easily inserted or removed.

Still another object of this invention is to provide a simple dependable punched card reading device which is readily adaptable for a variety of applications.

More particularly, this invention features a punched card reading device employing a motor driven transparent drum adapted to rotate at high speed with a section thereof passing between a bank of lights disposed outside of the drum and in register with a bank of photodetectors disposed within the drum. A flexible punched card is simply inserted in the transparent drum so that the card lies flat against the inner walls of the drum. As the drum rotates, it moves the card past the detecting head comprising the lights and detectors which are adapted to produce an output signal as a punched section of the card is carried past.

Figure 1:
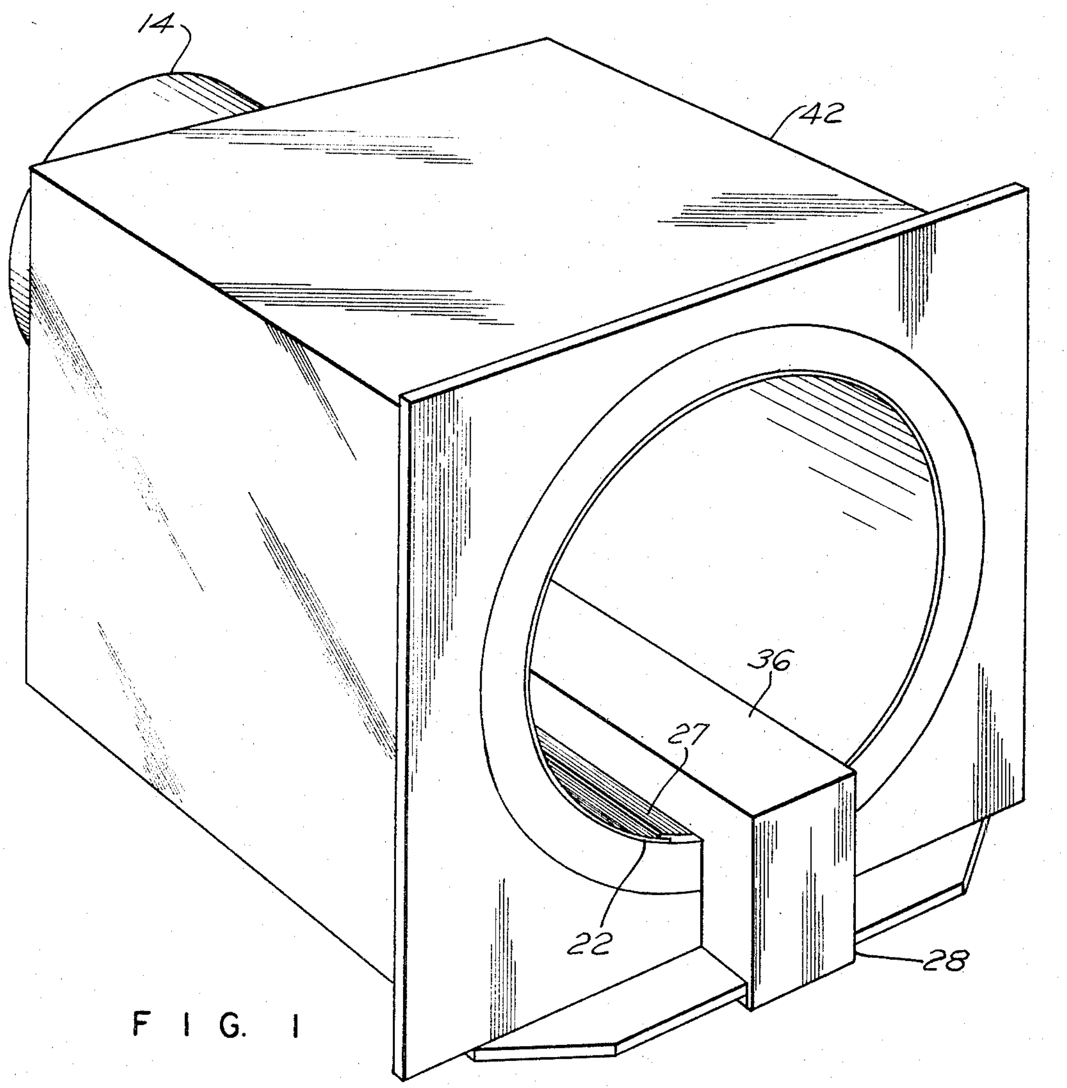
Figures 2, 3, 4:
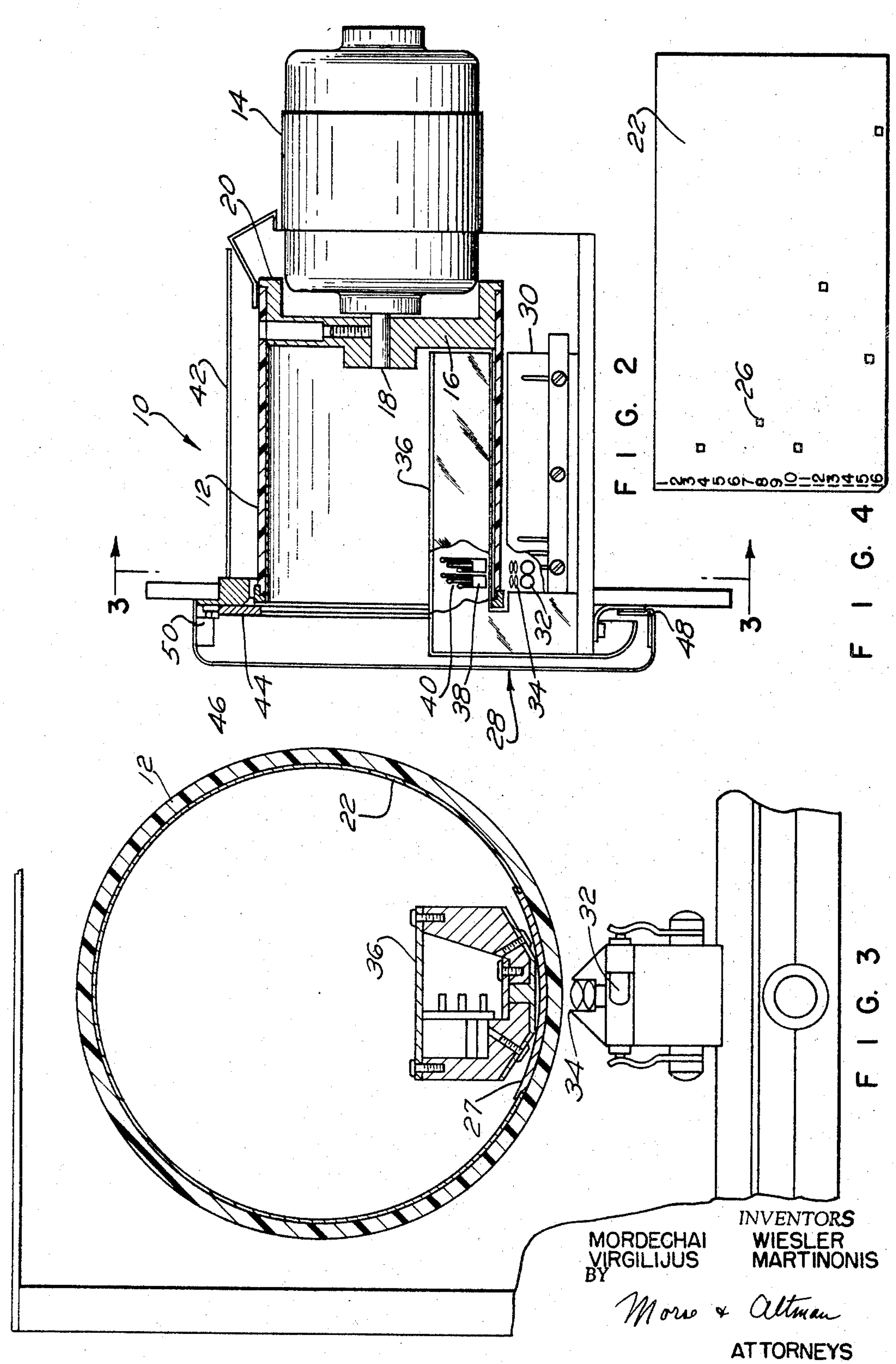

But these and other features of the invention, along with further objects and advantages thereof, will become more fully apparent from the following detailed description of a preferred embodiment of the invention with reference being made to the accompanying drawings in which:

FIG. 1 is a view in perspective of a punched card reading device made according to the invention, FIG. 2 is a view in side elevation, partly in section, of the device, FIG. 3 is a cross-sectional view taken along the line 3—3 of FIG. 2, and, FIG. 4 is a plan view of a punched card which may be employed in the reader device.

Referring now to the drawings, the reference character 10 generally indicates a photoelectric punched card reader and programming device which is organized generally about a transparent cylindrical drum 12 mounted for rotation about its longitudinal axis by means of a motor 14. The drum 12 is connected to the motor by means of an annular disc 16 secured fast to a motor drive shaft 18 and being formed with a peripheral flange 20 engaging one end of the drum 12. The opposite end of the drum is open for insertion of a punched card 22 such as that shown in FIG. 4. Typically, the punched card is rectangular with a notched corner and is fabricated from flexible paperboard stock. Each card is normally formed with one or more punched holes 26 distributed in a coded pattern over the card in selected columns and rows corresponding to a predetermined program.

The normally flat card 22 may be readily curled for insertion in the drum 12 through its open end and once inserted its natural resiliency will cause it to spring outwardly and lie flat against the inner walls of the drum as best shown in FIG. 3. The drum 12 is formed from clear, transparent or translucent material, such as Plexiglas or the like, so that light may readily pass through the walls of the drum for reasons that will presently appear.

Mounted along the inner wall of the transparent drum is an opaque latch 27 which serves as a spacer between the card ends and to hold the card ends in place.

Associated with the drum 12 is a readout head 28 of bifurcated construction. One leg of the head extends into the drum 12 lengthwise thereof and in spaced relation to the walls of the drum. The other leg is exterior to the drum and extends in spaced relation to the drum wall and parallel to the inner leg.

The outer leg of the readout unit 28 is indicated by the reference character 30 and comprises a bank of light bulbs 32 arranged in a row and each in register with a lens system 34 for focusing a beam of light radially inward through the transparent drum and against the card 22 carried therein. Each light bulb and its associated lens system is located to register with a particular column on the punched card 12 so that any opening or hole in the card 22 in a particular column will pass a pulse of light through the card as the drum and card are rotated between the two legs of the readout unit.

The inner leg of the readout unit is indicated by the reference character 36 and comprises a row of photosensitive devices 38 such as phototransistors or the like, with each photo responsive device being located oppositely a light bulb and lens system in the leg 30. In this fashion, a pulse of light passed through a particular hole in the punched card 22 will cause an electrical pulse to be developed in a particular photoresponsive device 38, with the signal being taken off by leads 40. It will be understood that the coded signals generated by the light pulses passing through the coded card may be used for a variety of purposes such as serving to program an automatic system, for example. Each card may, therefore, provide a separate program and the unit will respond by producing a series of pulses corresponding to the pattern of punchings in the card 22.

The drum 12 preferably is housed within a cabinet 42 having an open front wall 44 to which is hinged a door 46. Hinges 48 are provided along the lower edge of the door and a magnetic catch 50 is employed at the top of the door for holding the door in a closed position. The door will normally be closed while the unit is in operation since the drum 12, in practice, spins at rates on the order of 1800 to 3600 r.p.m.

The card is inserted or removed with the door in the open position with the card positioned so that the free ends are on either side of the readout head to permit the card to clear the head during insertion or removal. It will be understood that for each cycle of the drum the card will be fully scanned and a series of output signals will be generated for use in carrying out a program, for example. The drum with the card passes continuously between the lights and the phototransistors so that the program will be repeated on a continuous basis as long as the drum is rotated. The lights are arranged and focused to read only one column of the card at a time, and while a great many columns may be used on the card, up to 100, for example, only one column is read at a given instant. The reader, it will be understood, has a large bit capacity and has the advantage of not requiring large punched card switching mechanisms and plug boards previously employed for readers of this type.

Typical reading speeds for the device are on the order of 4000 bits per second when the drum is rotating at 1800 r.p.m. and 8000 bits per second with the drum moving at 3600 r.p.m. Typical card capacity is 16 lines having 100 columns each. Scan time ranges from 8 to 33 milliseconds depending upon the speed of rotation.

The reader and programmer described herein is adapted for a number of applications such as testing electronic components, for example under various parameters. Also, the device may be used in computer and instruction systems, for routing conveyor systems, for automatic order filing systems, for information retrieval applications and for automatic process control systems.

While the invention has been described with particular reference to the illustrated embodiment, it will be understood that numerous modifications thereto will appear to those skilled in the art. For example, in place of the continuously running motor described, a stepping motor may be employed. In this embodiment the transparent drum would index through a small angle so as to step the card column by column past the reading head. Also, it will be understood that the above description and accompanying drawings should be taken as illustrative of the invention and not in a limiting sense.

Having thus described the invention, what we claim and desire to obtain by Letters Patent of the United States is:

1. Apparatus for reading punched cards, comprising:
(a) a cylindrical drum of translucent material,
(b) a motor having a drive shaft,
(c) means mounting said drum to said shaft for rotation about its longitudinal axis,
(d) fixed light emitting means located in spaced relation to the drum wall and focussed thereon,
(e) fixed light detecting means located in spaced relation to the opposite side of said wall in register with said light emitting means,
(f) an opaque latch on the inner wall of said drum and formed with grooves to receive and position the ends of a card curled and inserted in said drum.
(g) said drum being adapted to accommodate a normally flat card that is curled and inserted therein and held flat against the inner walls thereof, said translucent drum and said punched card being adapted to pass coded light pulses between said light emitting and light detecting means upon rotation of said drum.

2. Apparatus according to claim 1 wherein said light emitting and light detecting means comprise a bifurcated reading head one leg of which extends interiorly of said drum and the other leg extends exteriorly thereof.

3. Apparatus for reading punched cards, comprising:
(a) a cylindrical drum of translucent rigid material,
(b) means mounting said drum for driving rotation about its longitudinal axis,
(c) a fixed bifurcated readout head bridging an edge of the drum wall,
(d) light emitting means disposed along one leg of said head in spaced relation to the drum wall and focussed thereon,
(e) light detecting means disposed along the other leg of said head in spaced relation to the opposite side of said wall and in register with said light emitting means,
(f) a latch in the form of an opaque arcuate member mounted on the inner wall of said drum and formed with grooves along opposite edges thereof to receive and position the ends of a card curled and inserted in said drum,
(g) said drum being adapted to accommodate a card inserted therein and held flat against the inner walls thereof, said translucent drum and said punched card being adapted to pass coded light pulses between said light emitting and light detecting means upon rotation of said drum.

References Cited

UNITED STATES PATENTS

| | | | |
|---|---|---|---|
| 2,677,815 | 5/1954 | Brustman | 250—219 X |
| 3,055,582 | 9/1962 | Battison et al. | 235—61.11 |
| 3,055,583 | 9/1962 | Demer | 235—61.11 |
| 3,114,144 | 12/1963 | Woo | 340—347 |

MAYNARD R. WILBUR, *Primary Examiner.*

J. SHERIDAN, *Assistant Examiner.*